US008285821B2

(12) United States Patent
Challener et al.

(10) Patent No.: US 8,285,821 B2
(45) Date of Patent: Oct. 9, 2012

(54) METHOD, APPARATUS, AND SYSTEM OF FORWARD CACHING FOR A MANAGED CLIENT

(75) Inventors: David Carroll Challener, Raleigh, NC (US); Richard Wayne Cheston, Morrisville, NC (US); Howard Locker, Cary, NC (US); Randall Scott Springrield, Chapel Hill, NC (US); Rod D. Waltermann, Rougemont, NC (US)

(73) Assignee: Lenovo (Singapore) Pte. Ltd., Tech Park (SG)

( * ) Notice: Subject to any disclaimer, the term of this patent is extended or adjusted under 35 U.S.C. 154(b) by 259 days.

(21) Appl. No.: 12/368,882

(22) Filed: Feb. 10, 2009

(65) Prior Publication Data
US 2010/0205375 A1 Aug. 12, 2010

(51) Int. Cl.
*G06F 15/177* (2006.01)
(52) U.S. Cl. .................................................. 709/220
(58) Field of Classification Search .............. 709/217, 709/220
See application file for complete search history.

(56) References Cited

U.S. PATENT DOCUMENTS

| | | | | |
|---|---|---|---|---|
| 7,155,539 B2* | 12/2006 | Vange et al. | | 709/217 |
| 7,657,638 B2* | 2/2010 | Deen et al. | | 709/229 |
| 2005/0160150 A1* | 7/2005 | Kao | | 709/212 |
| 2006/0075072 A1* | 4/2006 | Sinclair et al. | | 709/219 |
| 2007/0143344 A1* | 6/2007 | Luniewski et al. | | 707/104.1 |
| 2007/0266027 A1* | 11/2007 | Gattegno et al. | | 707/8 |
| 2008/0028034 A1* | 1/2008 | Currid et al. | | 709/217 |
| 2008/0028035 A1* | 1/2008 | Currid et al. | | 709/217 |
| 2008/0028052 A1* | 1/2008 | Currid et al. | | 709/222 |
| 2008/0120403 A1* | 5/2008 | Lowery et al. | | 709/223 |
| 2009/0132797 A1* | 5/2009 | Lo | | 713/2 |
| 2009/0150401 A1* | 6/2009 | Allen et al. | | 707/10 |
| 2009/0182868 A1* | 7/2009 | McFate et al. | | 709/224 |
| 2009/0193413 A1* | 7/2009 | Lee | | 718/1 |
| 2010/0058332 A1* | 3/2010 | DeHaan | | 717/177 |
| 2010/0241748 A1* | 9/2010 | Ansari et al. | | 709/225 |

* cited by examiner

*Primary Examiner* — Wing Chan
*Assistant Examiner* — Alicia Baturay
(74) *Attorney, Agent, or Firm* — Kunzler Law Group, PC

(57) ABSTRACT

A method, apparatus, and system are disclosed of forward caching for a managed client. A storage module stores a software image on a storage device of a backend server. The backend server provides virtual disk storage on the storage device through a first intermediate network point for a plurality of diskless data processing devices. Each diskless data processing device communicates directly with the first intermediate network point. The storage module caches an image instance of the software image at the first intermediate network point. A tracking module detects an update to the software image on the storage device. The storage module copies the updated software image to the first intermediate network point as an updated image instance.

20 Claims, 7 Drawing Sheets

300

| Software Image ID 310a | SI Location 315a | SI Size 320a | SI Hits 325a |
|---|---|---|---|
| INP ID 340a | II Location 345a | INP Distance 350a | II Hits 355a |
| INP ID 340b | II Location 345b | INP Distance 350b | II Hits 355b |

305a — first row; 360a, 360b — subsequent rows

| Software Image ID 310b | SI Location 315b | Size 320b | SI Hits 325b |
|---|---|---|---|
| INP ID 340c | II Location 345c | INP Distance 350c | II Hits 355c |
| INP ID 340d | II Location 345d | INP Distance 350d | II Hits 355d |
| INP ID 340e | II Location 345e | INP Distance 350e | II Hits 355e |

305b — first row; 360c, 360d, 360e — subsequent rows

| SI ID | II Location | SI Location | SI Size | II Hits |
|---|---|---|---|---|
| 310a | 345a | 315a | 320a | 355a |
| 310b | 345b | 315b | 320b | 355b |

| Software Image ID 310a | INP ID 340a | DPD ID 510a | Timestamp 515a |
|---|---|---|---|
| Software Image ID 310b | INP ID 340b | DPD ID 510b | Timestamp 515b |
| Software Image ID 310c | INP ID 340c | DPD ID 510c | Timestamp 515c |

| Software Image ID 310a | II Location 345a | DPD ID 510a | Timestamp 515a |
|---|---|---|---|
| Software Image ID 310b | II Location 345b | DPD ID 510b | Timestamp 515b |
| Software Image ID 310c | II Location 345c | DPD ID 510c | Timestamp 515c |

METHOD, APPARATUS, AND SYSTEM OF FORWARD CACHING FOR A MANAGED CLIENT

BACKGROUND OF THE INVENTION

1. Field of the Invention

This invention relates to caching and more particularly relates to forward caching for a managed client.

2. Description of the Related Art

Diskless data processing devices are often used as managed clients. A diskless data processing device may lack a non-volatile storage device such as a hard disk drive. Instead, data for the diskless data processing device is stored on a virtual disk of a remote storage device. The diskless data processing device may access the data on the remote storage device through a network.

Storing data for the diskless data processing device on the remote storage device simplifies managing the diskless data processing device as a client. For example, administrators may easily access and configure the virtual disk for a plurality of diskless data processing devices. Unfortunately, storing data for the diskless data processing device on the remote storage device may also increase the latency for retrieving data from the virtual disk over retrieving the data from the local hard disk drive.

SUMMARY OF THE INVENTION

From the foregoing discussion, there is a need for a method, apparatus, and system that caches data for a managed client system. Beneficially, such a method, apparatus, and system would forward cache instructions and data, reducing the latency for retrieving the instructions and data for a diskless data processing device.

The present invention has been developed in response to the present state of the art, and in particular, in response to the problems and needs in the art that have not yet been fully solved by currently available forward caching methods. Accordingly, the present invention has been developed to provide a method, apparatus, and system for forward caching that overcome many or all of the above-discussed shortcomings in the art.

A method of the present invention is presented for forward caching. In one embodiment, the method includes storing a software image, caching an image instance, detecting an update, and copying the updated software image.

A storage module stores a software image on a storage device of a backend server. The backend server provides virtual disk storage on the storage device through a first intermediate network point for a plurality of diskless data processing devices. Each diskless data processing device communicates directly with the first intermediate network point. The storage module caches an image instance of the software image at the first intermediate network point.

A tracking module detects an update to the software image on the remote storage device. The storage module copies the updated software image to the first intermediate network point as an updated image instance.

The apparatus for forward caching is provided with a plurality of modules configured to functionally execute the steps of the method. The modules include a storage module and a tracking module.

The storage module stores a software image on a storage device of a backend server. The backend server provides virtual disk storage on the storage device through a first intermediate network point for a plurality of diskless data processing devices. Each diskless data processing device communicates directly with the first intermediate network point. The storage module caches an image instance of the software image at the first intermediate network point.

The tracking module maintains a software image database at the backend server of the software image and the corresponding image instance. In addition, the tracking module detects an update to the software image on the storage device. The storage module copies the updated software image to the first intermediate network point as an updated image instance.

A system of the present invention is also presented for forward caching. The system may be embodied in a managed client system. In particular, the system, in one embodiment, includes a plurality of diskless data processing devices, Storage Area Network (SAN), a first intermediate network point, and a backend server.

The SAN comprises at least one virtual disk. The backend server is in communication with the plurality of diskless data processing devices through the first intermediate network point and with the SAN. In addition, the backend server provides virtual disk storage for the plurality of data processing devices on the SAN.

The backend server comprises a storage module and a tracking module. The storage module stores a software image on the SAN. The storage module further caches an image instance of the software image at the first intermediate network point.

The tracking module maintains a software image database of the backend server of the software image and corresponding image instance and detects an update to the software image on the SAN. The storage module copies the updated software image to the first intermediate point as an updated image instance.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention forward caches data to an intermediate network point by detecting an update to a software image and copying the updated software image to the intermediate network point as an updated image instance. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 3 is a schematic block diagram illustrating one embodiment of a software image database of the present invention;

FIG. 4 is a schematic block diagram illustrating one embodiment of an image instance database of the present invention;

FIG. 5 is a schematic block diagram illustrating one embodiment of a server access log of the present invention;

FIG. 6 is a schematic block diagram illustrating one embodiment of an intermediate network point access log of the present invention;

DETAILED DESCRIPTION OF THE INVENTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform logic functions, execute computer readable programs stored on tangible storage devices, and/or execute programmed functions. Modules may also include a computer readable storage medium comprising a computer readable program stored on a tangible storage device that performs a function when executed by a hardware circuits such as a processor, microcontroller, or the like.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
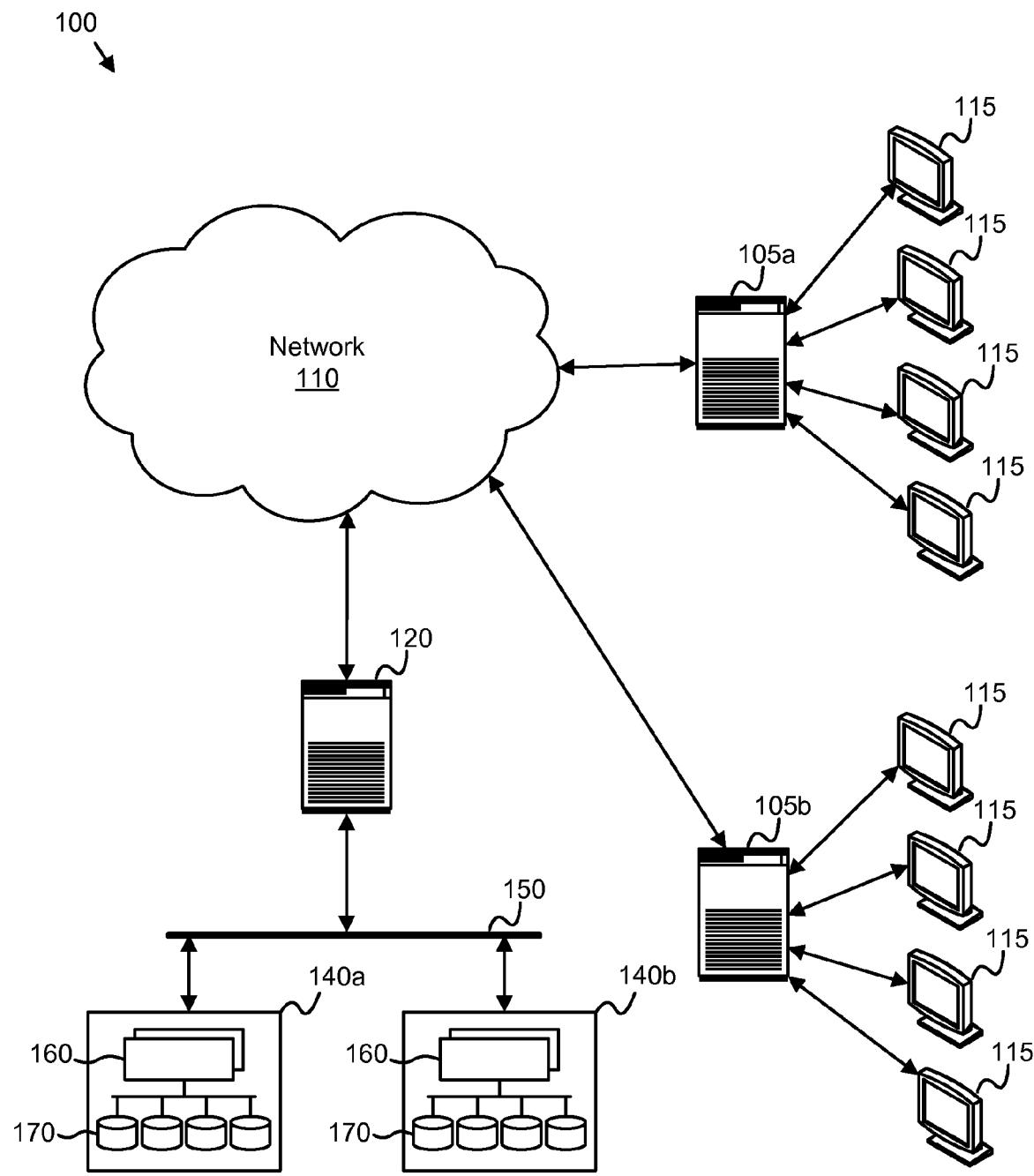
FIG. 1 is a schematic block diagram illustrating one embodiment of a managed client system in accordance with the present invention.

FIG. 1 is a schematic block diagram illustrating one embodiment of a managed client system 100 in accordance with the present invention. The system 100 includes one or more intermediate network points 105, a network 110, a plurality of diskless data processing devices 115, a backend server 120, an internal network 150, and one or more storage subsystems 140. Although for simplicity two intermediate network points 105, one network 110, eight diskless data processing devices 115, one backend server 120, one internal network 150, and two storage subsystems 140 are shown, any number of intermediate network points 105, networks 110, diskless data processing devices 115, backend servers 120, internal networks 150, and storage subsystems 140 may be employed.

Each storage subsystem 140 may include one or more controllers 160 and one or more storage devices 170. Each storage device 170 may be a hard disk drive, an optical storage device, a micromechanical storage device, a holographic storage device, or the like. The backend server 120, the internal network 150, and the storage subsystems 140 may be organized as a SAN.

The diskless data processing devices 115 do not have a high capacity data storage device such as a hard disk drive. Instead, the diskless data processing devices 115 store instructions and data on the storage devices 170. Hereafter, instructions and data are referred to as data. For example, when a diskless data processing device 115 boots, the diskless data processing device 115 requests operating system data from the backend server 120 through the intermediate network point 105 and the network 110. The backend server 120 retrieves the requested data from a storage device 170 and transmits the requested data through the network 110 and the intermediate network point 105 to the diskless data processing device 115.

The intermediate network point 105 may be a router. Alternatively, the intermediate network point 105 may be a server. In one embodiment, the intermediate network point 105 is a network appliance that connects the diskless data processing devices 115 to the network 110. In an alternate embodiment, communications between the storage device 170 and the diskless data processing device 115 need not pass through the intermediate network point 105, but communications between the intermediate network point 105 and the diskless data processing device 115 may have a lower latency than communications between the storage device 170 and the diskless data processing device 115. For example, the intermediate network point 105 may be a server in communication with the diskless data processing device 115.

The storage devices 170 and intermediate network point 105 may appear to the diskless data processing devices 115 as a virtual disk. For example, the storage devices 170 may be organized as one or more logical volumes. Each logical volume may serve as a virtual disk for a diskless data processing device 115. In one embodiment, the specified data is consolidated onto one or more logical volumes. For example, the operating system for the diskless data processing devices 115 may be stored on a single first logical volume. Each diskless data processing device 115 may be configured to access the operating system from the first logical volume.

Storing data for the diskless data processing devices 115 on the storage devices 170 allows the data for the diskless data processing devices 115 to be centrally managed. For example, administrator may configure all of the software for each diskless data processing device 115 by managing the data stored on the storage devices 170.

Storing data for the diskless data processing devices 115 remotely may also increase the latency for retrieving data. The present invention reduces the latency by forward caching data from the storage devices 170 to the intermediate network points 105 as will be described hereafter.

Figure 2:
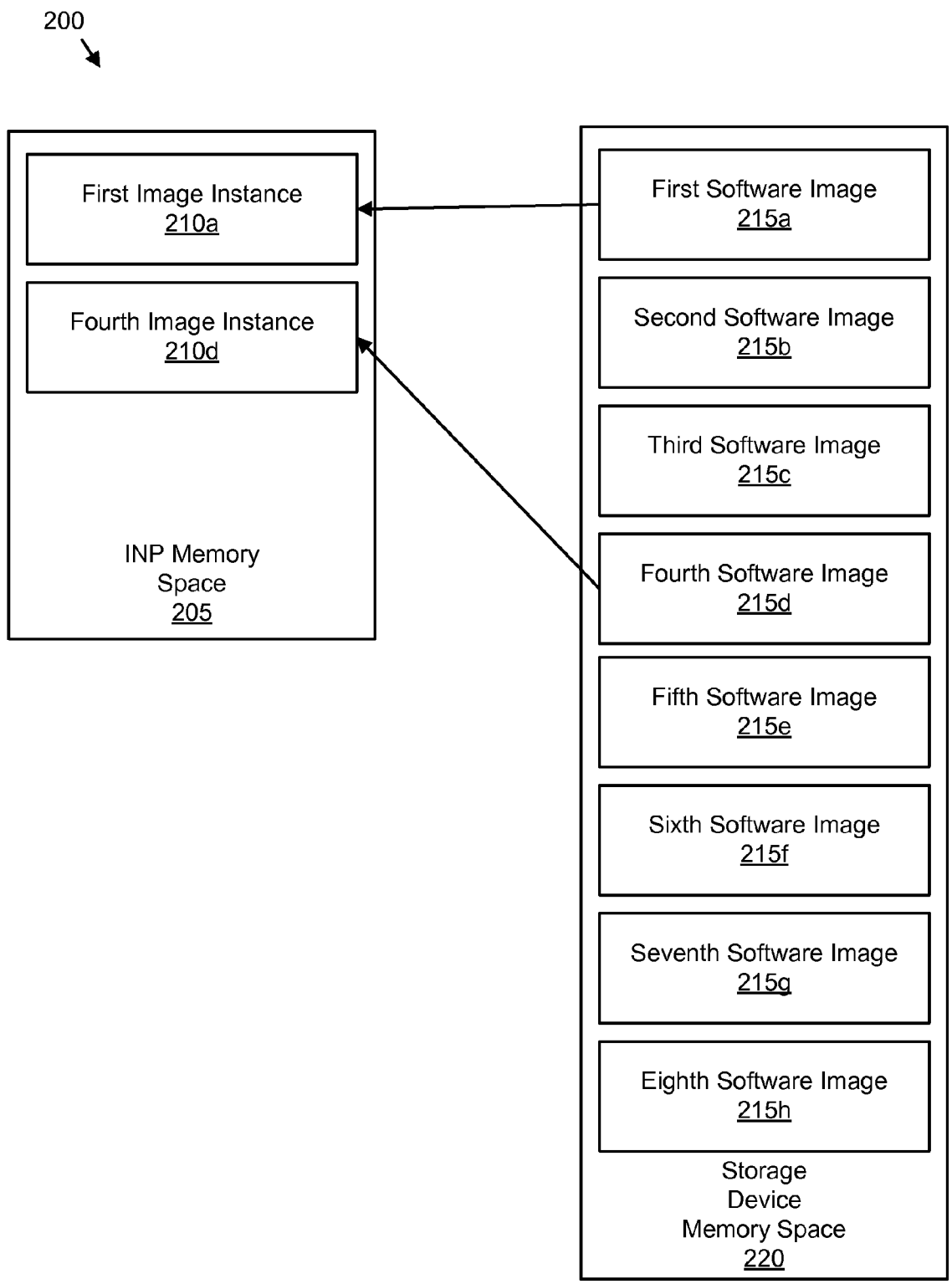
FIG. 2 is a schematic block diagram illustrating one embodiment of memory spaces of an intermediate network point and a storage device of the present invention.

FIG. 2 is a schematic block diagram illustrating one embodiment of memory spaces 200 of an intermediate network point 105 and a storage device 170 of the present invention. The memory spaces 200 store data for the diskless data processing devices 115. The memory spaces 200 may be semiconductor memory, storage spaces such as hard disk drives, or the like. The description of the memory spaces 200 refers to elements of FIG. 1, like numbers referring to like elements. The memory spaces 200 include an intermediate network point memory space 205 and a storage device memory space 220.

The storage device memory space 220 stores a plurality of software images 215. The software images 215 may be for the diskless data processing devices 115. In one embodiment, the software images 215 are organized into one or more logical volumes. For example, the first, second, and third software images 215*a-c* may comprise an operating system for the diskless data processing devices 115 and be organized as a logical volume.

The present invention forward caches software images 215 as image instances 210 to the intermediate network point memory space 205. Each image instance 210 is a copy of a corresponding software image 215. For example, the first software image 215*a* may be a portion of an operating system image for one or more diskless data processing devices 115 in communication with the intermediate network point 105 of the intermediate network point memory space 205. The first image instance 210*a* may be a copy of the first software image 215*a*.

When a diskless data processing device 115 requests the first software image 215*a*, the intermediate network point 105 determines that the first software image 215*a* is available from the intermediate network point memory space 205 as the first image instance 210*a*. In one embodiment, the intermediate network point 105 returns the first image instance 210*a* to the diskless data processing device 115 to fulfill the request for the first software image 215*a*.

In addition, the diskless data processing device 115 may frequently use the fourth software image 215*d*. The fourth software image 215*d* may be an application program. The present invention may also cache the fourth software image 215*d* to the intermediate network point memory space 205 as the fourth image instance 210*d*, making the application program available to the diskless data processing devices 115 from the intermediate network point 105.

By forward caching image instances 210 to the intermediate network point memory space 205, the present invention reduces the latency for accessing the software images 215. In addition, the present invention manages the image instances 210 stored in the intermediate network point memory space 205 as will be described hereafter.

FIG. 3 is a schematic block diagram illustrating one embodiment of a software image database 300 of the present invention. The software image database 300 is used to manage the caching of image instances 210 to the intermediate network point 105. The backend server 120 may maintain the software image database 300. In one embodiment, a tracking module residing on the backend server 120 may maintain the software image database 300. The tracking module will be described hereafter. The description of the software image database 300 refers to elements of FIGS. 1-2, like numbers referring to like elements.

The database 300 includes one or more software entries 305. Each software entry 305 corresponds to a software image 215 stored on a storage device 170. In one embodiment, each software entry 305 includes a software image identifier 310, a software image location 315, a software image size 320, and a count of software image hits 325. The software image identifier 310 identifies a software image 215. The software image identifier 310 may include a description of the software image 215, a version number, an installation date, and the like. The software image location 315 may be a logical location for the software image 215. The software image size 320 may specify a size of the software image 215 such as 700 Megabytes (MB). The count of software image hits 325 may track a number of times the software image 215 and/or an image instance 210 of the software image 215 is accessed during a specified time interval. For example, the count of software image hits 325 may track a number of times the software image 215 and each image instance 210 of the software image 215 is accessed in a 24-hour period.

In addition, each software entry 305 includes one or more image instance entries 360. The image instance entries 360 include information on each image instance 210 of the software image 215 of the software entry 305. Each image instance entry 360 may comprise an intermediate network point identifier 340, an image instance location 345, an intermediate network point distance 350, and a count of image instance hits 355.

The intermediate network point identifier 340 identifies the intermediate network point 105 where image instance 210 is stored. The image instance location 345 may specify a logical location for the image instance 210. The intermediate network point distance 350 may specify a logical distance in hops between the backend server 120 and the intermediate network point 105. Alternatively, the intermediate network point distance 350 may specify an average latency for communications between the backend server 120 and the intermediate network point 105. The count of image instance hits 355 may track a number of times an image instance 210 is accessed at the intermediate network point 105.

FIG. 4 is a schematic block diagram illustrating one embodiment of an image instance database 400 of the present invention. In one embodiment, each intermediate network point 105 maintains an image instance database 400. In a certain embodiment, an instance module that will be described hereafter maintains the image instance database 400. The description of the image instance database 400 refers to elements of FIGS. 1-3, like numbers referring to like elements.

The image instance database 400 includes a plurality of instance entries 405. Each instance entry corresponds to an image instance 210 stored on the intermediate network point 105. In one embodiment, each instance entry 405 includes the software image identifier 310, the image instance location 345, the software image location 315, the software image size 320, and the count of image instance hits 355. The image instance database 400 is used by the intermediate network point 105 to manage the image instances 210 stored on the intermediate network point 105.

FIG. 5 is a schematic block diagram illustrating one embodiment of a server access log 500 of the present invention. The backend server 120 may maintain the server access log 500 to track accesses of the software instances 215 and/or corresponding image instances 210. In one embodiment, the tracking module tracks accesses to the software instances 215 using the server access log 500. The description of the server access log 500 refers to elements of FIGS. 1-4, like numbers referring to like elements.

In one embodiment, the server access log 500 includes the software image identifier 310, the intermediate network point identifier 340, a diskless data processing device identifier 510, and a timestamp 515. The diskless data processing device identifier 510 may identify a diskless data processing device 115. The timestamp 515 may record time that a diskless data processing device 115 accesses a software image 215 of the software image identifier 310.

For example, a diskless data processing device 115 may access an image instance 210 from an intermediate network point 105. The tracking module may record the intermediate network point identifier 340 of the intermediate network point 105 and the diskless data processing device identifier 510 of the diskless data processing device 115. The tracking module may further determine the software image 215 corresponding to the image instance 210 and record the software image identifier 310 for the software image 215 and the timestamp 515.

In an alternative example, the diskless data processing device 115 may access the software image 215 directly from a storage device 170. The tracking module may record the intermediate network point identifier 340 of the intermediate network point 105 forwarding the access request and the diskless data processing device identifier 510 of the diskless data processing device 115. The tracking module may further record the software image identifier 310 for the software image 215 and the timestamp 515.

FIG. 6 is a schematic block diagram illustrating one embodiment of an intermediate network point access log 600 of the present invention. The intermediate network point 105 may maintain the intermediate network point access log 600. In one embodiment, an instance module that will be described hereafter maintains the intermediate network point access log 600. The description of the intermediate network point access log 600 refers to elements of FIGS. 1-5, like numbers referring to like elements The intermediate network point access log 600 includes one or more instance entries 605. Each instance entry 605 includes the software image identifier 310, the image instance location 345, a diskless data processing device identifier 510, and the timestamp 515. The intermediate network point 105 may record an instance entry 605 each time diskless data processing device 115 accesses a software image 215.

For example, a diskless data processing device 115 may access the image instance 210 from the intermediate network point 105. The tracking module may record the diskless data processing device identifier 510 of the diskless data processing device 115, the image instance location 345, the software image identifier 310, and the timestamp 515.

Figure 7:
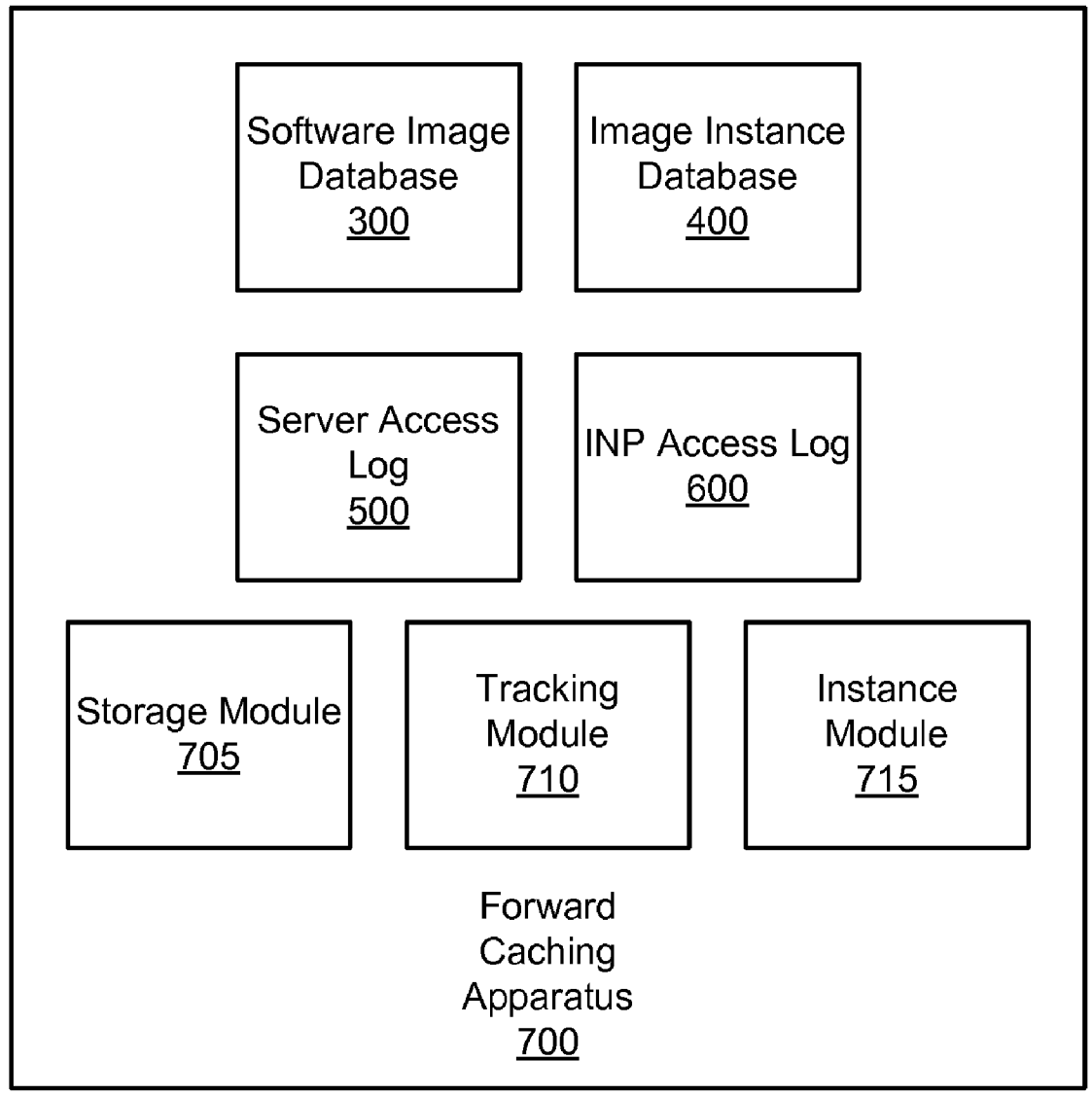
FIG. 7 is a schematic block diagram illustrating one embodiment of a forward caching apparatus of the present invention.

FIG. 7 is a schematic block diagram illustrating one embodiment of a forward caching apparatus 700 of the present invention. The apparatus 700 caches software images 215 as instance images 210 to intermediate network points 105 for use by the diskless data processing devices 115. The description of the apparatus 700 refers to elements of FIGS. 1-6, like numbers referring to like elements. The apparatus 700 includes the software image database 300, one or more image instance databases 400, the server access log 500, one or more intermediate network point access logs 600, the storage module 705, the tracking module 710, and the instance module 715.

The software image database 300, image instance database 400, server access log 500, intermediate network point access logs 600, storage module 705, tracking module 710, and instance module 715 may each be embodied in a computer readable storage medium. The computer readable storage medium may include a tangible storage device such as a hard disk drive of an intermediate network point 105 or the backend server 120 storing a computer readable program. The computer readable program may be executed by a computer such as the intermediate network point 105, the backend server 120, or the like. In one embodiment, the computer readable program is executed by a processor of a computer.

The storage module 705 stores the software image 215 on the storage device 170 of the backend server 120 and caches the image instance 210 of the software image 215 at the intermediate network point 105.

The tracking module 710 maintains the software image database 300 at the backend server 120 of the software image 215 and the corresponding image instance 210. In one embodiment, the tracking module 710 records accesses to software images 215 in the server access log 500. The tracking module 710 further detects an update to the software image 215 on the storage device 170. The storage module 705 copies the updated software image 215 to the intermediate network point 105 as an updated image instance 210.

In one embodiment, the instance module 715 maintains the image instance database 400 at the intermediate network point 105. In one embodiment, the instance module 715 records accesses to software images 215 and/or image instances 210 in the intermediate network point access log 600.

One of skill in the art will recognize that the present invention may be practiced with data on the software images 215, image instances 210, accesses to the software images 215, and accesses to the image instances 210 stored in alternate configurations. For example, the software image database 300, image instance database 400, server access log 500, and intermediate network point access log 600 may be embodied in a single distributed database.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 8:
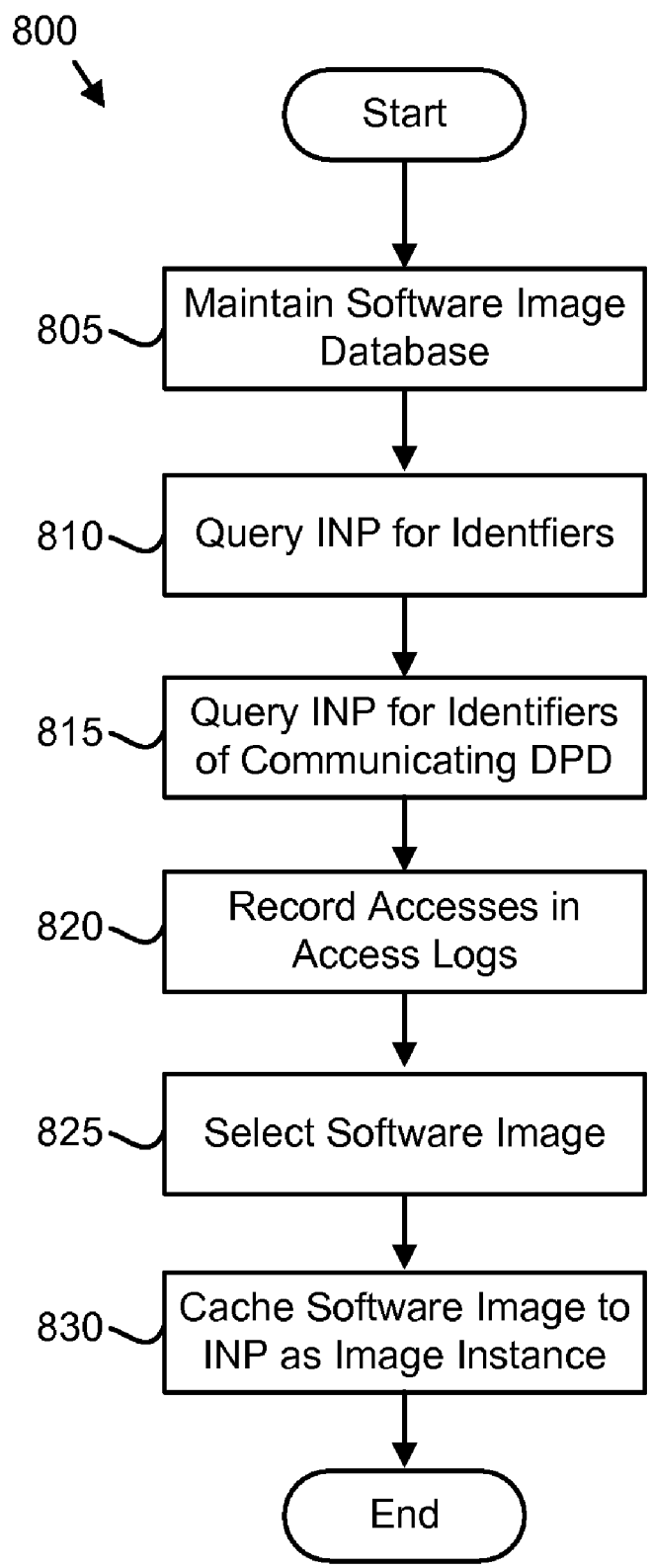
FIG. 8 is a schematic flow chart diagram illustrating one embodiment of a forward caching method of the present invention.

FIG. 8 is a schematic flow chart diagram illustrating one embodiment of a forward caching method 800 of the present invention. The method 800 substantially includes the steps to carry out the functions presented above with respect to the operation of the described apparatus and system of FIGS. 1-7. In one embodiment, the method 800 is implemented with a computer readable storage medium comprising a computer readable program stored on a tangible storage device. The computer readable storage medium may be integrated into a computing system, such as the backend server 120 and/or intermediate network point 105, wherein the computer readable program executed by the computing system performs the method 800.

The method 800 starts and in one embodiment, the tracking module 710 maintains 805 the software image database 300. In a certain embodiment, tracking module 710 records the caching of an image instance 215 along with the corresponding software instance 210 in the softer image database 300. In addition, the tracking module 710 may add information to the software image database 300. For example, the tracking module 710 may update the counts of the software image hits 325 with image instance hits 355 from information parsed from the server access log 500 and intermediate network point access log 600.

The tracking module 710 may further query 810 each intermediate network points 105 for an identifier for the intermediate network point 105. The identifiers may be stored as the intermediate network point identifiers 340 in the software image database 300.

In addition, the tracking module 710 may query 815 each intermediate network points 105 for identifiers for each diskless data processing device 115 in communication with the intermediate network point 105. The identifiers for the diskless data processing devices 115 may be stored as the diskless data processing device identifiers 510.

In one embodiment, the tracking module 710 further records 820 accesses from the diskless data processing devices 115 to software images 215 and/or image instances 210 in the server access log 500. In a certain embodiment, the instance module 715 also records 820 accesses to the software images 215 and/or the image instances 210 in the intermediate network point access log 600. In one embodiment, the instance module 715 periodically forwards a summary of the intermediate network point access log 600 to the tracking module 710.

The tracking module 710 may select 825 the software image 215 using the server access log 500 and/or the server software image database 300. In one embodiment, the tracking module selects 820 the software image 215 to minimize a frequency of instances where the corresponding image instance 210 is unavailable. For example, the tracking module 710 may select 825 a software image 215 with a highest count of software image hits 325.

In an alternate embodiment, the tracking module 710 selects 825 the software image 215 to minimize a quantity of image instance data that is unavailable. For example, the tracking module 710 may multiply the count of software image hits 325 by the software image size 320, wherein the product is an image instance quantity. The tracking module 710 may select a software image 215 with a highest image instance quantity.

The storage module 705 caches 830 the selected software image 215 to the intermediate network point 105 as an image instance 210 and the method 800 ends. In one embodiment, the storage module 705 copies a software image 215 to the memory space 205 of the intermediate network point 105. In addition, the tracking module 710 may record the software image identifier 310, software image location 315, software image size 320, intermediate network point identifier 340, image instance location 345, and intermediate network point distance 350 in the software image database 300. In a certain embodiment, the instance module 715 may record the software image identifier 310, image instance location 345, software image location 315, and software image size 320 in the image instance database 400.

The method 800 selects 825 a software image 215 and caches 830 the software image 215 as an image instance 210 to an intermediate network point 105. The diskless data processing devices 115 may then access the image instance 210 instead of the software image 215. Because the access latency of the intermediate network point 105 is less than the access latency of the backend server 120 and the storage devices 170, the diskless data processing devices 115 are able to access needed data more rapidly.

Figure 9:
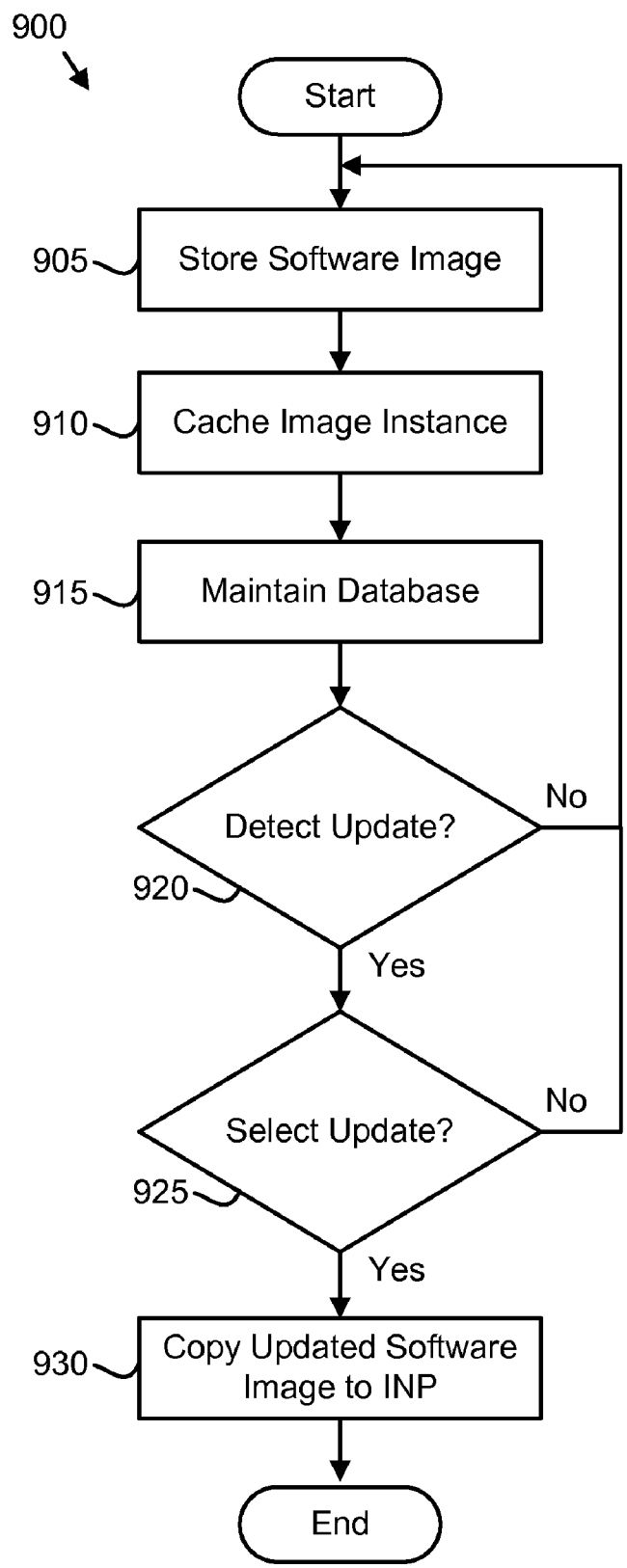
FIG. 9 is a schematic flow chart diagram illustrating one embodiment of a cache update method of the present invention.

FIG. 9 is a schematic flow chart diagram illustrating one embodiment of a cache update method 900 of the present invention. The method 900 substantially includes the steps to carry out the functions presented above with respect to the operation of the described apparatus and system of FIGS. 1-7. In one embodiment, the method 900 is implemented with a computer readable storage medium comprising a computer readable program stored on a tangible storage device. The computer readable storage medium may be integrated into a computing system, such as the backend server 120 and/or intermediate network point 105, wherein the computer readable program executed by the computing system performs the method 900.

The method 900 starts, and in one embodiment, the storage module 705 stores 905 a software image 215 to a storage device 170 of a backend server 120. The backend server 120 provides virtual disk storage on the storage device 170 through an intermediate network point 154 a plurality of diskless data processing devices 115. Each diskless data processing device 115 communicates directly with the intermediate network point 105.

In one embodiment, an administrator directs the storage module 705 to store 905 the software image 215. For example, the administrator may direct the storage module 705 to store 905 a database application software image 215 to the storage device 170. In an alternate embodiment, the user may store the software image 215 to the storage device 170. For example, the user may install an accounting application on a diskless data processing device 115, copying the accounting application to the diskless data processing device's virtual disk which is the storage device 170. In one embodiment, an operating system and/or application may be embodied in a plurality of software images 215.

The storage module 705 further caches 910 an image instance 210 of the softer image 215 to the intermediate network point 105. The caching 910 of the image instance 210 may be embodied in the method 800 of FIG. 8.

The tracking module 710 detects 915 an update to the software image 215 on the storage device 170. In one embodiment, the storage module 705 notifies the tracking module 710 each time a software image 215 is stored 905 to the storage device 170. Alternatively, the tracking module 710 may monitor writes to the storage device 170.

If the tracking module 710 does not detect 920 an update to the software image 215, the storage module 705 continues to store 905 software images 215 on the storage device 170. If the tracking module 710 detects 920 the update to the software image 215, the tracking module 710 determines 925 whether to select the updated software image 215 for caching. In one embodiment, the tracking module 710 determines 925 whether to select the updated software image 215 based on whether image instances 210 of the original software image 215 that the updated software image 215 is replacing are already cached on intermediate network points 105.

For example, the tracking module 710 may scan the software image database 300 for a software entry 305 for the original software image 215. If the software entry 305 the original software image 215 is found, the tracking module 710 may determine 925 to select the updated software image 215 for caching. In one embodiment, the tracking module 710 creates a new software entry 305 for the updated software image 215. In addition, the tracking module 710 may copy the count of software instance hits 325 from the software entry 305 for the original software image 215 to the count of software instance hits 325 for the updated software image 215.

If the tracking module 710 determines 925 that the update should not be selected, the storage module 705 continues to store 905 software images 215 on the storage device 170. If the tracking module 710 determines 925 that the update should be selected, the storage module copies 930 the updated software image 215 as the image instance 210 to the intermediate network point 105 and the method 900 ends.

The method 900 detects 920 updated software images 215 and copies the updated software images 215 to the intermediate network points 105. Thus as the administrator updates software images 215 for the managed client system 100, the updated software images 215 are automatically cached as image instances 210 on the intermediate network points 105. As a result, the administrator does not need to configure image instances 210 on the intermediate network points 105.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A tangible storage device storing a computer readable program for forward caching, wherein the computer readable program when executed on at least one computer causes the at least one computer to:
    store a software image on a storage device of a backend server, the backend server providing virtual disk storage on the storage device through a plurality of intermediate network points for a plurality of diskless data processing devices, wherein the intermediate network points are network appliances connecting the plurality of diskless data processing devices to a network, the backend server connects to the intermediate network points through the network, and each diskless data processing device communicates directly with the intermediate network points;
    maintain a software image database at the backend server of the software image and the corresponding image instance;
    query the plurality of intermediate network points for each diskless data processing device connected to each intermediate network point;
    select an image instance of the software image for a first intermediate network point if accesses of the software image by diskless data processing devices connected to the first intermediate network point exceed an access threshold;
    cache the image instance of the software image at the first intermediate network point in response to selecting the first intermediate network point;
    detect an update to the software image on the storage device; and
    copy the updated software image to the first intermediate network point as an updated image instance in response to detecting the update.

2. The tangible storage device of claim 1, wherein the computer readable program further causes the at least one computer to:
    query the plurality of intermediate network points for identifiers for each diskless data processing device in communication with the intermediate network points;
    record each access of the storage device by each diskless data processing device in a server access log; and
    select the software image using the server access log.

3. The tangible storage device of claim 2, wherein the software image is selected to minimize a frequency of instances where the corresponding image instance is unavailable.

4. The tangible storage device of claim 2, wherein the software image is selected to minimize a quantity of image instance data that is unavailable.

5. The tangible storage device of claim 2, wherein the computer readable program further causes the at least one computer to:
    query the plurality of intermediate network points for each diskless data processing device connected to each intermediate network point; and
    select the image instance for the first intermediate network point using the first server access log if accesses of the software image by diskless data processing devices connected to the first intermediate network point exceed an access threshold.

6. The tangible storage device of claim 1, wherein each intermediate network point is a router.

7. The tangible storage device of claim 1, wherein the backend server and the storage device are embodied in a Storage Area Network (SAN).

8. The tangible storage device of claim 7, wherein each intermediate network point emulates the SAN.

9. The tangible storage device of claim 1, wherein the computer readable program further causes the at least one computer to maintain an image instance database at the first intermediate network point of the image instance and the corresponding software image.

10. The tangible storage device of claim 1, wherein the computer readable program further causes the at least one computer to record each access of the first intermediate network point by each diskless data processing device in an intermediate network point access log.

11. An apparatus comprising:
    a tangible storage device storing a computer readable program;
    a processor executing the computer readable program, the computer readable program comprising:
    a storage module storing a software image on a storage device of a backend server, the backend server providing virtual disk storage on the storage device through a plurality of intermediate network points for a plurality of diskless data processing devices, wherein the intermediate network points are network appliances connecting the plurality of diskless data processing devices to a network, the backend server connects to the intermediate network points through the network, and each diskless data processing device communicates directly with the intermediate network points, querying the plurality of intermediate network points for each diskless data processing device connected to each intermediate network point, selecting an image instance of the software image for a first intermediate network point if accesses of the software image by diskless data processing devices connected to the first intermediate network point exceed an access threshold, and caching the image instance of the software image at the first intermediate network point in response to selecting the first intermediate network point;
    a tracking module maintaining a software image database at the backend server of the software image and the corresponding image instance and detecting an update to the software image on the storage device; and the storage module further copying the updated software image to the first intermediate network point as an updated image instance in response to detecting the update.

12. The apparatus of claim 11, wherein the tracking module:
queries the plurality of intermediate network points for identifiers for each diskless data processing device in communication with the intermediate network points;
records each access of the storage device by each diskless data processing device in a server access log; and
selects the software image using the server access log.

13. The apparatus of claim 12, wherein the tracking module further:
queries the plurality of intermediate network points for each diskless data processing devices connected to each intermediate network point; and
selects the image instance for the first intermediate network point using the first server access log if accesses of the software image by diskless data processing devices connected to the first intermediate network point exceed an access threshold.

14. The apparatus of claim 11, further comprising an instance module maintaining an image instance database at the first intermediate network point of the image instance and the corresponding software image.

15. The apparatus of claim 14, wherein the instance module further records each access of the first intermediate network point by each diskless data processing device in an intermediate network point access log.

16. A system comprising:
a plurality of diskless data processing devices;
a SAN comprising at least one virtual disk;
a plurality of intermediate network points wherein at least one intermediate network point is in communication with each diskless data processing device, wherein each intermediate network point is a network appliance connecting the plurality of diskless data processing devices to the SAN;
a backend server that is in communication with the SAN and connects to the plurality intermediate network points through the SAN and to the plurality of diskless data processing devices through the intermediate network points, the backend server providing virtual disk storage for the plurality of data processing devices on the SAN and comprising
a storage module storing a software image on a SAN, querying the plurality of intermediate network points for each diskless data processing device connected to each intermediate network point, selecting an image instance of the software image for a first intermediate network point if accesses of the software image by diskless data processing devices connected to the first intermediate network point exceed an access threshold, and caching the image instance of the software image at the first intermediate network point;
a tracking module maintaining a software image database at the backend server of the software image and the corresponding image instance and detecting an update to the software image on the SAN; and
the storage module further copying the updated software image to the first intermediate network point as an updated image instance in response to detecting the update.

17. The system of claim 16, wherein each intermediate network point is a router.

18. The system of claim 16, wherein each intermediate network point is a server.

19. The system of claim 16, wherein the first intermediate network point comprises an instance module maintaining an image instance database at the first intermediate network point of the image instance and the corresponding software image.

20. The system of claim 19, wherein the instance module further records each access of the at least one virtual disk by each diskless data processing device in an intermediate network point access log.

* * * * *